United States Patent
Bosco

(10) Patent No.: US 10,471,914 B2
(45) Date of Patent: Nov. 12, 2019

(54) DEPLOYABLE DEBRIS PROTECTION DEVICE FOR AN AUTOMOTIVE VEHICLE

(71) Applicant: GM GLOBAL TECHNOLOGY OPERATIONS LLC, Detroit, MI (US)

(72) Inventor: Anthony A. Bosco, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 3 days.

(21) Appl. No.: 15/791,679

(22) Filed: Oct. 24, 2017

(65) Prior Publication Data
US 2019/0118750 A1   Apr. 25, 2019

(51) Int. Cl.
*B60R 19/00* (2006.01)
*B60R 19/54* (2006.01)
*B62D 25/20* (2006.01)

(52) U.S. Cl.
CPC .......... *B60R 19/54* (2013.01); *B62D 25/2072* (2013.01); *B60R 2019/002* (2013.01)

(58) Field of Classification Search
CPC ............................. B62D 35/008; B62D 35/001
USPC .......... 296/180.3, 108.5, 26.12, 26.14, 26.15
See application file for complete search history.

(56) References Cited

U.S. PATENT DOCUMENTS

| | | | | |
|---|---|---|---|---|
| 2,194,396 A | * | 3/1940 | Klavik | B60K 11/08 180/68.1 |
| 4,119,339 A | * | 10/1978 | Heimburger | B62D 35/005 296/180.5 |
| 4,342,146 A | * | 8/1982 | Hanson | B60P 3/32 180/89.1 |
| 4,489,806 A | * | 12/1984 | Shimomura | B62D 35/005 180/313 |
| 4,824,165 A | * | 4/1989 | Fry | B62D 35/001 296/180.3 |
| 4,889,382 A | * | 12/1989 | Burst | B60K 11/08 296/180.5 |
| 4,904,015 A | * | 2/1990 | Haines | B62D 35/001 296/180.3 |
| 5,056,860 A | * | 10/1991 | Cornacchia | B62D 15/02 280/762 |
| 5,092,648 A | * | 3/1992 | Spears | B62D 35/001 296/180.3 |
| 5,098,148 A | * | 3/1992 | Hoban | B60J 7/1657 29/401.1 |
| 5,275,249 A | * | 1/1994 | Nelson | B62D 25/12 180/68.1 |

(Continued)

*Primary Examiner* — Jeffrey J Restifo

(57) ABSTRACT

A vehicle includes a body with an underbody portion having an outer periphery. At least one traction wheel is rotatably coupled to the body. The traction wheel has a track width defined by an inboard plane and an outboard plane. A movable panel with an inboard edge and an outboard edge is coupled to the underbody portion. An actuator is coupled to the movable panel and configured to actuate the movable panel between a stowed position and a deployed position. In the deployed position the outboard edge projects outboard of the outboard plane of the track width, and in the stowed position the outboard edge is retracted within the outer periphery of the underbody portion. A controller is configured to, in response to an operating condition being satisfied during a drive cycle, control the actuator to actuate the movable panel from the stowed position to the deployed position.

11 Claims, 3 Drawing Sheets

(56) References Cited

U.S. PATENT DOCUMENTS

| | | | | |
|---|---|---|---|---|
| 5,522,637 A * | 6/1996 | Spears | B62D 35/001 | 296/180.3 |
| 5,536,062 A * | 7/1996 | Spears | B62D 35/001 | 180/903 |
| 5,538,315 A * | 7/1996 | Dixon | B62D 25/168 | 296/180.1 |
| 5,595,419 A * | 1/1997 | Spears | B62D 35/001 | 296/180.1 |
| 5,934,728 A * | 8/1999 | Nishi | B60P 3/0252 | 296/26.15 |
| 6,053,551 A * | 4/2000 | Blondeau | B60P 3/34 | 296/172 |
| 6,141,850 A * | 11/2000 | Frank | B62D 33/08 | 29/401.1 |
| 6,428,084 B1 * | 8/2002 | Liss | B62D 35/001 | 296/180.1 |
| 6,866,317 B2 * | 3/2005 | Ferren | B62D 33/08 | 296/165 |
| 6,886,882 B2 * | 5/2005 | Farlow | B62D 35/001 | 296/180.1 |
| 6,886,883 B2 * | 5/2005 | Jacquemard | B62D 35/005 | 296/180.5 |
| 6,926,346 B1 * | 8/2005 | Wong | B62D 35/001 | 296/180.5 |
| 7,000,719 B2 * | 2/2006 | Ceccarani | B60K 13/02 | 180/68.1 |
| 7,322,638 B2 * | 1/2008 | Larson | B62D 35/007 | 296/180.5 |
| 7,380,870 B2 * | 6/2008 | Froeschle | B62D 35/007 | 296/180.5 |
| 7,380,871 B2 * | 6/2008 | Froeschle | B62D 35/007 | 296/180.5 |
| 7,387,330 B2 * | 6/2008 | Froeschle | B62D 35/007 | 296/180.5 |
| 7,387,331 B2 * | 6/2008 | Froeschle | B62D 35/007 | 296/180.5 |
| 7,399,026 B2 * | 7/2008 | Froeschle | B62D 35/007 | 296/180.5 |
| 7,438,347 B2 * | 10/2008 | Froeschle | B62D 35/007 | 296/180.5 |
| 7,506,909 B2 * | 3/2009 | Barnes | B62D 21/14 | 296/26.12 |
| 7,641,275 B2 * | 1/2010 | Campbell | B60J 1/20 | 296/180.1 |
| 8,196,993 B2 * | 6/2012 | Smith | B62D 35/001 | 296/180.3 |
| 8,303,025 B2 * | 11/2012 | Senatro | B62D 35/001 | 296/180.4 |
| 8,308,222 B2 * | 11/2012 | Ondracek | B62D 35/008 | 296/180.1 |
| 8,403,401 B2 * | 3/2013 | Rinehart | B62D 35/001 | 296/180.3 |
| 8,727,425 B1 * | 5/2014 | Senatro | B62D 35/001 | 296/180.4 |
| 8,827,351 B1 * | 9/2014 | Kenevan | B62D 35/001 | 180/903 |
| 8,925,999 B2 * | 1/2015 | Nelson | B62D 35/001 | 296/180.3 |
| 9,272,741 B2 * | 3/2016 | Gerst | B62D 35/001 | |
| 9,643,665 B2 * | 5/2017 | Hommes | B62D 35/00 | |
| 9,932,074 B2 * | 4/2018 | Sarhadiangardabad | B62D 35/02 | |
| 9,975,585 B2 * | 5/2018 | Auden | B62D 37/02 | |
| 9,994,267 B1 * | 6/2018 | Marmo | B62D 35/008 | |
| 2011/0042998 A1 * | 2/2011 | Rinehart | B62D 35/001 | 296/180.3 |
| 2016/0244107 A1 * | 8/2016 | Ishiba | B62D 35/008 | |
| 2017/0137075 A1 * | 5/2017 | Povinelli | B62D 35/008 | |

* cited by examiner

DEPLOYABLE DEBRIS PROTECTION DEVICE FOR AN AUTOMOTIVE VEHICLE

TECHNICAL FIELD

The present disclosure relates to automotive vehicles, and more particularly to body structures for automotive vehicles.

INTRODUCTION

Automotive vehicles frequently travel across road surfaces of varying condition, and therefore may be subjected to stones and other road debris kicked up by vehicle tires. Collisions between vehicles and such stones or debris may result in undesirable and detrimental marring of the exterior of the vehicles.

SUMMARY

A vehicle according to the present disclosure includes a body with an underbody portion. The underbody portion has an outer periphery. The vehicle also includes at least one traction wheel which is rotatably coupled to the body. The traction wheel has a track width defined by an inboard plane and an outboard plane. The vehicle additionally includes a movable panel movably coupled to the underbody portion. The movable panel has an inboard edge and an outboard edge. The movable panel is movable between a stowed position and a deployed position. In the deployed position the outboard edge projects outboard of the outboard plane of the track width, and in the stowed position the outboard edge is retracted within the outer periphery of the underbody portion. The vehicle further includes an actuator coupled to the movable panel and configured to actuate the movable panel between the stowed position and the deployed position. The vehicle still further includes a controller. The controller is configured to, in response to an operating condition being satisfied during a drive cycle, control the actuator to actuate the movable panel from the stowed position to the deployed position.

In an exemplary embodiment the movable panel has a fore portion and an aft portion, with the aft portion being pivotably coupled to the underbody portion. In such an embodiment, in the deployed position the fore portion is pivoted outboard from the underbody portion such that the outboard edge projects outboard of the outboard plane of the track width.

In an exemplary embodiment, the actuator includes a linear actuator.

In an exemplary embodiment, the operating condition corresponds to a vehicle speed exceeding a predefined threshold with the movable panel in the stowed position. In such an embodiment, the controller may be further configured to, in response to the vehicle speed being below or equal to the predefined threshold with the movable panel in the deployed position, control the actuator to move the movable panel from the deployed position to the stowed position.

In an exemplary embodiment, the operating condition corresponds to a vehicle transmission being shifted out of PARK with the movable panel in the stowed position. In such an embodiment, the controller may be further configured to, in response to the vehicle transmission being shifted into PARK with the movable panel in the deployed position, control the actuator to move the movable panel from the deployed position to the stowed position.

A method of controlling a vehicle according to the present disclosure includes providing a stone protection panel which is movably coupled to an underbody portion of the vehicle. The panel is movable between a stowed position and a deployed position. In the deployed position an outboard edge of the panel projects outboard of an outboard tread plane of a road wheel of the vehicle. The method also includes providing an actuator coupled to the panel and configured to actuate the panel between the stowed position and the deployed position. The method further includes, in response to a first operating condition being satisfied during a drive cycle, automatically controlling the actuator, via a controller, to actuate the panel from the stowed position to the deployed position. The method still further includes, in response to a second operating condition being satisfied during the drive cycle, automatically controlling the actuator, via the controller, to actuate the panel from the deployed position to the stowed position.

In an exemplary embodiment, the panel has a fore portion and an aft portion, with the aft portion being pivotably coupled to the underbody portion. In such an embodiment, controlling the actuator to actuate the panel includes controlling the actuator to pivot the panel relative to the underbody portion.

In an exemplary embodiment, the first operating condition corresponds to a vehicle speed exceeding a predefined threshold with the movable panel in the stowed position. In such an embodiment, the second operating condition may correspond to vehicle speed being equal or below the predefined threshold with the movable panel in the deployed position.

In an exemplary embodiment, the first operating condition corresponds to a vehicle transmission being shifted out of PARK with the movable panel in the stowed position. In such an embodiment, the second operation condition may correspond to the vehicle transmission being shifted into PARK with the movable panel in the deployed position.

Embodiments according to the present disclosure provide a number of advantages. For example, systems and methods according to the present disclosure may reduce likelihood of a stone throw damaging a vehicle body. Moreover, systems and methods according to the present disclosure may do so without inhibiting access to the vehicle.

The above advantage and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
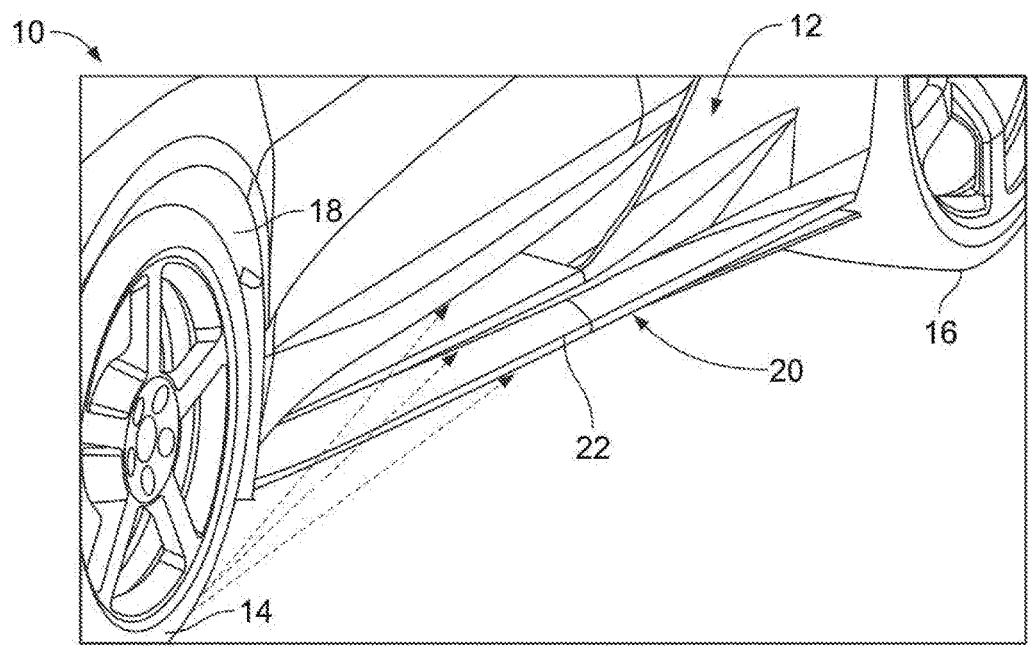
FIG. 1 is an illustration of a vehicle according to an embodiment of the present disclosure.

Referring now to FIGS. 1 through 4, a vehicle 10 according to the present disclosure is illustrated. The vehicle 10 has a body 12 which may enclose a passenger compartment. Generally, one or more occupants can be disposed in the passenger compartment. The passenger compartment may be provided with one or more doors that open and close to allow the occupants to enter and exit the vehicle 10. The body 12 includes a fore portion and an aft portion, with a plurality of fascia pieces or panels, some or all of which are visible from the outside of the passenger compartment of the vehicle 10. The fore and aft portions are spaced from each other along a longitudinal direction of the vehicle 10. Generally, the fascia pieces or panels surround the vehicle 10. The fascia pieces or panels can include one or more of: a front panel which can include a front bumper fascia, a rear panel which can include a rear bumper fascia, and side panel(s) which can include front quarter panel fascia(s) and rear quarter panel fascia(s). FIG. 1 illustrates one side of the vehicle 10, and the other side of the vehicle 10 may be generally a mirror image of the illustrated side. The sides of the vehicle 10 are spaced from each other in a lateral direction. The lateral direction is transverse or perpendicular to the longitudinal of the vehicle 10. Generally, the front bumper fascia can be disposed along the fore portion of the vehicle 10, and the rear bumper fascia can be disposed along the aft portion of the vehicle 10. Therefore, the front quarter panel fascia(s) can be disposed adjacent to the front bumper fascia and the rear quarter panel fascia(s) can be disposed adjacent to the rear bumper fascia.

The vehicle 10 has a plurality of road wheels including front wheels 14 and rear wheels 16 disposed in respective wheel wells 18. The road wheels elevate the body 12 above a driving surface with an underbody portion 20 of the body 12 proximate the driving surface. The underbody portion 20 has a periphery 22. The periphery 22 refers to an outermost portion of the underbody 20, e.g. an interface between the underbody 20 and a side panel, front fascia, or rear fascia.

Figure 2:
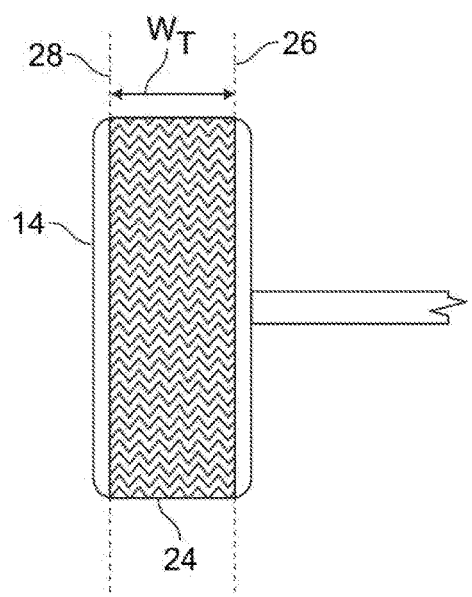
FIG. 2 is an illustration for a tire of a road wheel of a vehicle according to an embodiment of the present disclosure.

Each respective road wheel 14 has a tread region 24, as illustrated in FIG. 2. The tread region 24 is bounded by an inboard plane 26 and an outboard plane 28. The distance between the inboard plane 26 and the outboard plane 28 may be referred to as a track width $W_T$.

As the vehicle 10 traverses a driving surface, the road wheels 14, 16 may kick up small stones or other debris. A stone throw zone, referring to a region within which such debris may be kicked up, therefore exists within the track width $W_T$, i.e. between the inboard plane 26 and the outboard plane 28. Because the road wheels 14, 16 are generally disposed within the wheel wells 18, such debris is generally contained within the wheel wells 18. However, under some circumstances the outboard plane 28 may extend outside of the wheel well 18 and outside the periphery 22 of the underbody 20, as illustrated by the dashed lines in FIG. 1. As non-limiting examples, this may occur when the vehicle is turning, or in some vehicle body styles which are relatively narrow between the front road wheels 14 and the rear road wheels 16. In such circumstances, a potential exists for stones or debris to be kicked up and strike the body 12 of the vehicle 10.

Figures 3A, 3B:
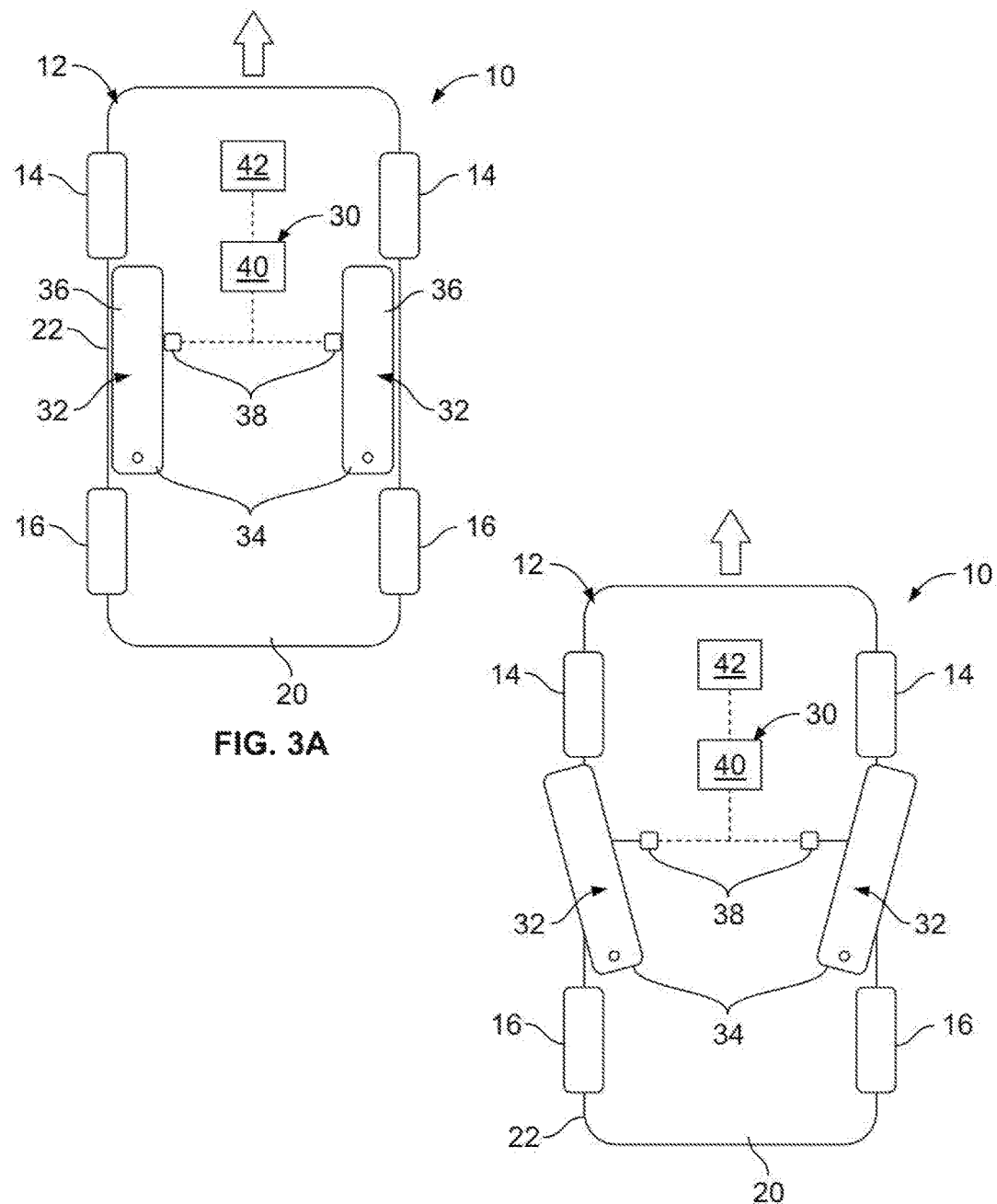
FIGS. 3A and 3B are schematic representations of a vehicle according to an embodiment of the present disclosure.
Figure 4:
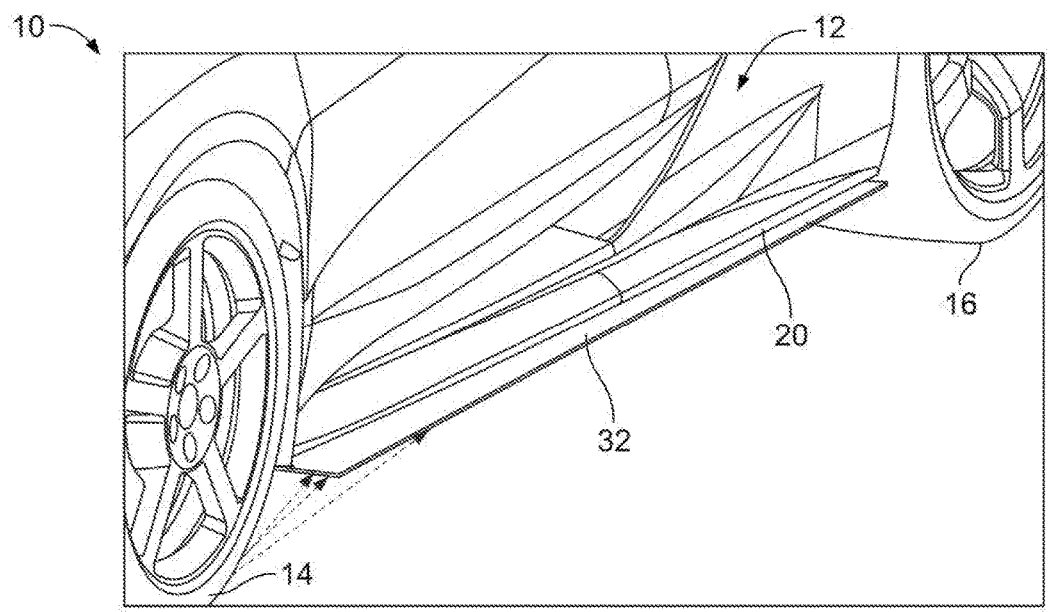
FIG. 4 is a second illustration of a vehicle according to an embodiment of the present disclosure.

Referring now to FIGS. 3A, 3B, and 4, the vehicle 10 has a direction of travel indicated by an arrow. The vehicle 10 is provided with a stone protection system 30. The stone protection system 30 includes at least one movable member or panel 32. In the illustrated embodiment, the stone protection system 30 includes a first movable member 32 on a driver side of the body 12 and a second movable member 32 disposed on a passenger side of the body 12. However, in other embodiments within the scope of the present disclosure, a greater or smaller number of movable members 32 may be implemented. The movable members 32 have a stowed position, as illustrated in FIG. 3A, and a deployed position, as illustrated in FIGS. 3B and 4.

In the stowed position, the movable members 32 are retained within the outer periphery 22 of the underbody portion 20. When stowed, the movable members 32 may thereby be secured below the vehicle without impeding vehicle ingress or egress.

In the deployed position, the movable members 32 extend outboard of the outer periphery 22 to intercept the stone throw zone, as illustrated in FIG. 4. When deployed, the movable members 32 thereby may reduce a likelihood that any thrown debris will contact a side panel of the vehicle 10.

In the illustrated embodiment, each movable member 32 has a first end 34, which is pivotably coupled to the underbody portion 20, and a second end 36. According to various embodiments, the second end 36 may swing freely, may slide within a track coupled to the underbody portion 20, or be coupled to other appropriate means for supporting pivoting motion of the movable member 32.

The movable members 32 may be formed of any material suitable for deflecting debris, including plastic materials, metallic materials, composite materials, other suitable materials, or any combination thereof.

The movable members 32 are coupled to actuators 38. The actuators 38 are coupled to the movable members 32 and configured to actuate the movable members 32 between the stowed position and the deployed position. The actuators may be of any suitable type, e.g. a linear electromechanical actuator.

The actuators 38 are under the control of a controller 40. While depicted as a single unit, the controller 40 may include one or more additional controllers collectively referred to as a "controller." The controller 40 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 40 is additionally in communication with at least one sensor 42, and is configured to control the actuators 38 in response to signals received from the sensor 42 as will be discussed below. The sensor 42(s) may include an accelerometer, a speed sensor, a transmission range sensor configured to detect a selected transmission gear, other sensor type, or a combination thereof. The controller 40 may control the actuators 38 to actuate the movable members 32 to the deployed position in response to a deploy condition associated with the sensor(s) 42 being satisfied, and to actuate the movable members 32 to the stowed position in response to a stow condition associated with the sensor(s) 42 being satisfied.

While the embodiment illustrated in FIGS. 1 through 4 includes movable members which pivot relative to the vehicle body, other arrangements are contemplated within the scope of the present disclosure. As an example, an alternate embodiment may include movable members which linearly translate relative to the vehicle body, e.g. by sliding within tracks secured to the underbody portion.

Figure 5:
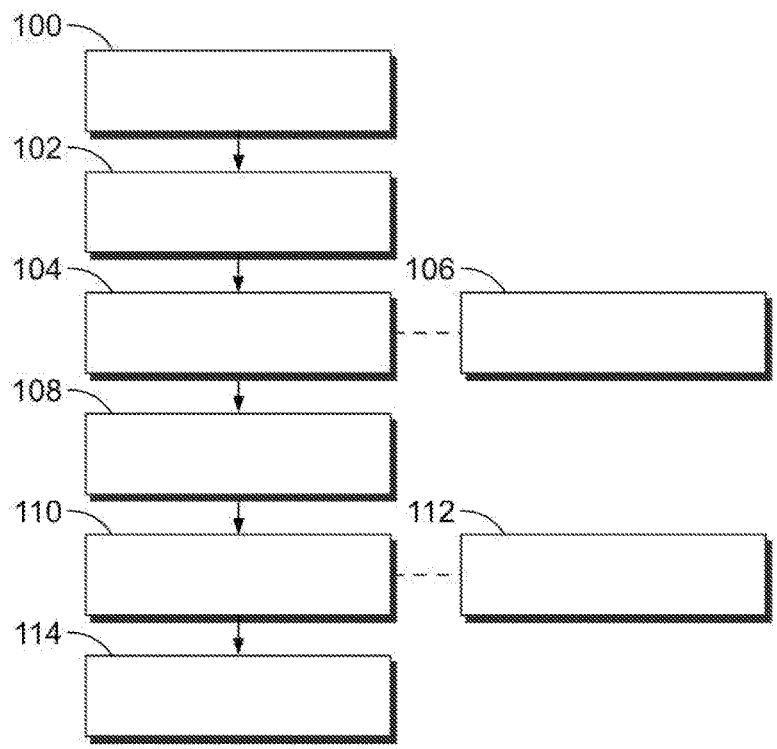
FIG. 5 is a flowchart representation of a method of controlling a vehicle according to a third embodiment of the present disclosure.

Referring now to FIG. 5, a method of controlling a vehicle according to the present disclosure is illustrated in flowchart form.

The algorithm begins at block 100 with the beginning of a drive cycle. Actuators, e.g. configured generally as the actuators 38 illustrated in FIGS. 3A and 3B, are controlled to a stowed setting. The stowed setting refers to an actuator setting at which the movable members are disposed in the stowed position.

A deploy condition is satisfied, as illustrated at block 104. The deploy condition may include, for example, vehicle speed exceeding a threshold, as illustrated at block 106. In an exemplary embodiment the threshold is zero; however, in some embodiments the threshold may be non-zero. In an alternative embodiment, the deploy condition may include a vehicle transmission being shifted out of PARK. Furthermore, in some embodiments other deploy conditions may be implemented.

In response to the deploy condition being satisfied, the actuators are controlled to a deployed setting, as illustrated in block 108. The deployed setting refers to an actuator setting at which the movable members are disposed in the deployed position.

A stow condition is satisfied, as illustrated at block 110. The stow condition may include, for example, vehicle speed falling being equal or below a threshold, as illustrated at block 112. In an exemplary embodiment the threshold is zero; however, in some embodiments the threshold may be non-zero. In an alternative embodiment, the stow condition may include a vehicle transmission being shifted into PARK. Furthermore, in some embodiments other deploy conditions may be implemented. In response to the stow condition being satisfied, the actuators are controlled to the stowed setting, as illustrated at block 114.

As may be seen, embodiments according to the present disclosure provides a system and method for reducing likelihood of a stone throw damaging a vehicle body. Moreover, systems and methods according to the present disclosure may do so without inhibiting access to the vehicle.

As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a body having an underbody portion, the underbody portion having an outer periphery;
at least one traction wheel rotatably coupled to the body, the traction wheel having a track width defined by an inboard plane and an outboard plane;
a movable panel movably coupled to the underbody portion, the movable panel having an inboard edge and an outboard edge, the movable panel being movable between a stowed position and a deployed position, wherein in the deployed position the outboard edge projects outboard of the outboard plane of the track width, and in the stowed position the outboard edge is retracted within the outer periphery of the underbody portion, wherein the movable panel has a fore portion and an aft portion, the aft portion being pivotably coupled to the underbody portion, and wherein in the deployed position the fore portion is pivoted outboard from the underbody portion such that the outboard edge projects outboard of the outboard plane of the track width;
an actuator coupled to the movable panel and configured to actuate the movable panel between the stowed position and the deployed position; and
a controller configured to, in response to an operating condition being satisfied during a drive cycle, control the actuator to actuate the movable panel from the stowed position to the deployed position.

2. The vehicle of claim 1, wherein the actuator includes a linear actuator.

3. The vehicle of claim 1, wherein the operating condition corresponds to a vehicle speed exceeding a predefined threshold with the movable panel in the stowed position.

4. The vehicle of claim 3, wherein the controller is further configured to, in response to the vehicle speed being below or equal to the predefined threshold with the movable panel in the deployed position, control the actuator to move the movable panel from the deployed position to the stowed position.

5. The vehicle of claim 1, wherein the operating condition corresponds to a vehicle transmission being shifted out of PARK with the movable panel in the stowed position.

6. The vehicle of claim 5, wherein the controller is further configured to, in response to the vehicle transmission being shifted into PARK with the movable panel in the deployed position, control the actuator to move the movable panel from the deployed position to the stowed position.

7. A method of controlling a vehicle comprising:
providing a stone protection panel movably coupled to an underbody portion of the vehicle, the panel being movable between a stowed position and a deployed position, wherein in the deployed position an outboard edge of the panel projects outboard of an outboard tread plane of a road wheel of the vehicle;
providing an actuator coupled to the panel and configured to actuate the panel between the stowed position and the deployed position;
in response to a first operating condition being satisfied during a drive cycle, automatically controlling the actuator, via a controller, to actuate the panel from the stowed position to the deployed position; and
in response to a second operating condition being satisfied during the drive cycle, automatically controlling the actuator, via the controller, to actuate the panel from the deployed position to the stowed position;
wherein the panel has a fore portion and an aft portion, the aft portion being pivotably coupled to the underbody portion, and wherein controlling the actuator to actuate the panel comprises controlling the actuator to pivot the panel relative to the underbody portion.

8. The method of claim 7, wherein the first operating condition corresponds to a vehicle speed exceeding a predefined threshold with the panel in the stowed position.

9. The method of claim 8, wherein the second operating condition corresponds to vehicle speed being equal or below the predefined threshold with the panel in the deployed position.

10. The method of claim 7, wherein the first operating condition corresponds to a vehicle transmission being shifted out of PARK with the panel in the stowed position.

11. The method of claim 10, wherein the second operating condition corresponds to the vehicle transmission being shifted into PARK with the panel in the deployed position.

* * * * *